(12) United States Patent
Hirooka et al.

(10) Patent No.: US 7,825,983 B2
(45) Date of Patent: Nov. 2, 2010

(54) IMAGE PICKUP APPARATUS HAVING A FRAME

(75) Inventors: Junji Hirooka, Higashimurayama (JP); Masahiro Kando, Yokohama (JP); Hideki Kawai, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 588 days.

(21) Appl. No.: 11/469,509

(22) Filed: Sep. 1, 2006

(65) Prior Publication Data
US 2007/0076115 A1   Apr. 5, 2007

(30) Foreign Application Priority Data
Sep. 12, 2005   (JP)   ............... 2005-264052

(51) Int. Cl.
*H04N 5/225* (2006.01)
(52) U.S. Cl. ............... 348/373; 348/376; 396/425; 396/419
(58) Field of Classification Search ............... 348/373; 396/425
See application file for complete search history.

(56) References Cited

U.S. PATENT DOCUMENTS 3,650,195 A * 3/1972 Jones .................. 396/422
D256,128 S * 7/1980 Borisoff ............... D16/243
4,259,000 A * 3/1981 Heredia ............... 396/422
4,272,177 A   6/1981 Ottenheimer
4,329,041 A   5/1982 Madge et al.
4,752,794 A * 6/1988 Bohannon ............. 396/189
4,754,295 A   6/1988 Scott
D302,697 S * 8/1989 Parrish ................ D16/242
4,866,465 A * 9/1989 Gallegos ............... 396/189
5,471,272 A   11/1995 Bucolo ................. 396/504
D399,863 S * 10/1998 LaCicero ............... D16/242
6,042,277 A * 3/2000 Errington .............. 396/419
6,826,366 B2 * 11/2004 Kaneko et al. .......... 396/388
7,033,088 B2 * 4/2006 Figgis et al. ........... 396/420
2002/0001474 A1 * 1/2002 Horiguchi ............. 396/535

FOREIGN PATENT DOCUMENTS

| JP | 51-006723 | | 1/1976 |
|---|---|---|---|
| JP | 2002328424 A | * | 11/2002 |
| JP | 2005-134697 | | 5/2005 |
| JP | 2005-167366 | | 6/2005 |

* cited by examiner

*Primary Examiner*—David L Ometz
*Assistant Examiner*—Angel L Garces-Rivera
(74) *Attorney, Agent, or Firm*—Cowan, Liebowitz & Latman, P.C.

(57) ABSTRACT

An image pickup apparatus comprises an image pickup unit for photographing an object and generating image data, and a frame forming an outline of the image pickup apparatus, wherein spaces are formed between the image pickup unit and the frame to allow an operator grasp inner planes of the frame.

4 Claims, 8 Drawing Sheets

IMAGE PICKUP APPARATUS HAVING A FRAME

CROSS-REFERENCE TO RELATED APPLICATION

This application claims the benefit of Japanese Patent Application No. 2005-264052, filed Sep. 12, 2005, which is hereby incorporated by reference herein in its entirety.

BACKGROUND OF THE INVENTION

1. Field of the Invention

The present invention relates to an image pickup apparatus such as a digital camera.

2. Description of the Related Art

The body of a recent image pickup apparatus such as a digital camera is becoming smaller and thinner, whereas a display unit such as a liquid crystal monitor mounted on the body is becoming large. This leads to an issue that a sufficient area of a user grip for picking up an object image is hard to be secured on the body. To solve this, for example, Japanese Patent Application Laid-open No. 2005-134697 proposes a grip capable of being supported in a state spaced apart from the body front wall.

A conventional image pickup device adopts a so-called monocock body structure. Therefore, in order to mount a user grip on the body, either concave and convex portions are required to be formed on the body or a separate grip member proposed by Japanese Patent Application Laid-open No. 2005-134697 is required. Namely, if an easy-to-hold performance is to be considered for the monocock body structure, there is no choice but to make large the concave and convex portions formed on the body or the separate grip member fabricated for the body.

Furthermore, if the monocock body structure is used, the body size and the size of the concave and convex portions formed on the body are fixed, so that requirements of all users cannot be met. Therefore, for example, users having large hands and users handling cameras with gloves are forced to select another type having a large body size even if the users desire the type having a small body size.

SUMMARY OF THE INVENTION

According to one aspect of the present invention, there is provide an image pickup apparatus comprising: an image pickup unit for picking up an object image and generating image data; and a frame forming an outline of the image pickup apparatus, wherein spaces are formed between the image pickup unit and the frame to allow an operator grasp inner planes of the frame.

Other features of the present invention will become apparent from the following detailed description when read in conjunction with the accompanying drawings.

Further features of the present invention will become apparent from the following description of exemplary embodiments (with reference to the attached drawings).

DESCRIPTION OF THE EMBODIMENTS

With reference to the accompanying drawings, description will be made on exemplary embodiments of the present invention.

First Embodiment

Figure 1:
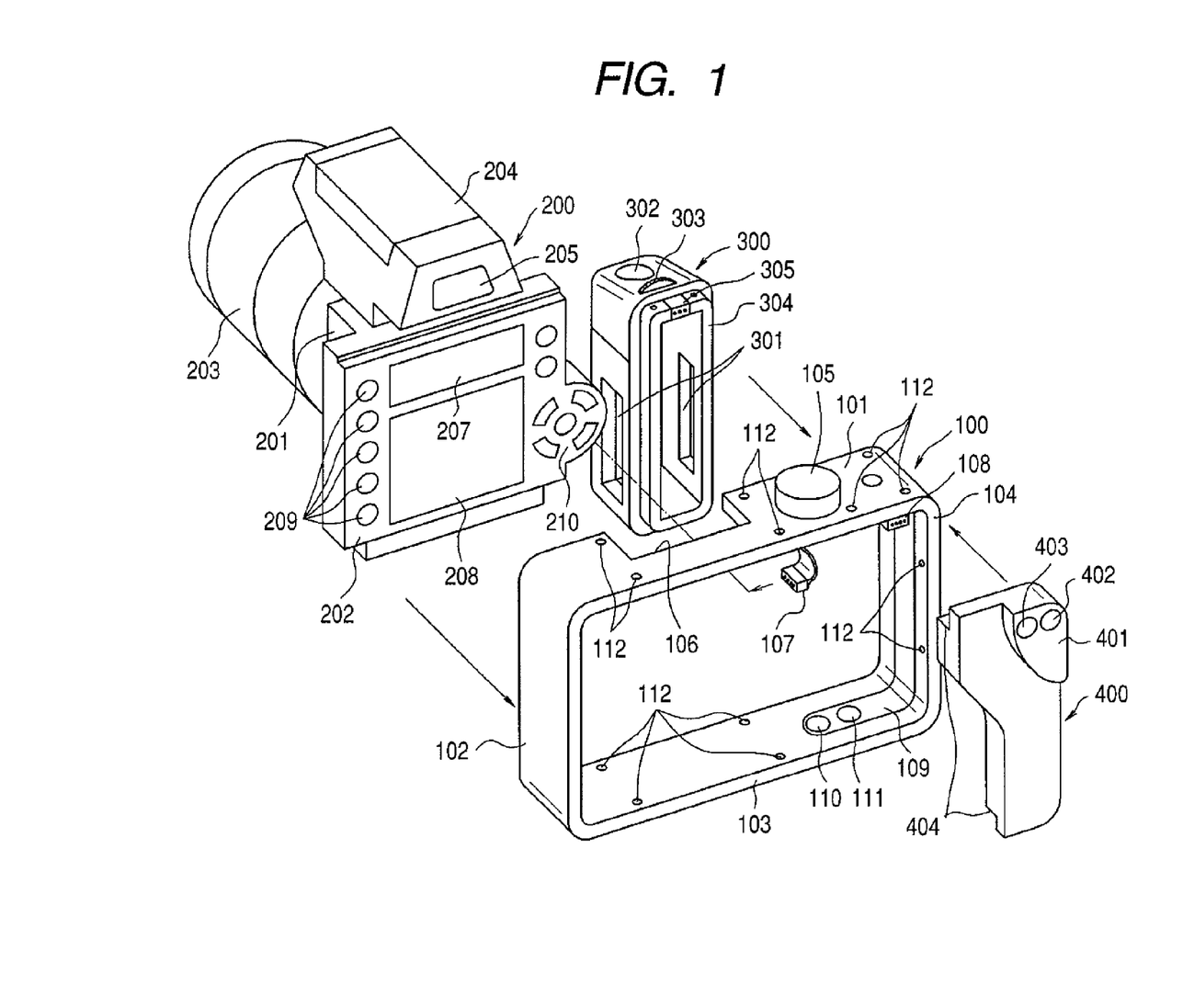
FIG. 1 is a perspective view of a digital single-lens reflex camera according to a first embodiment.
Figure 2:
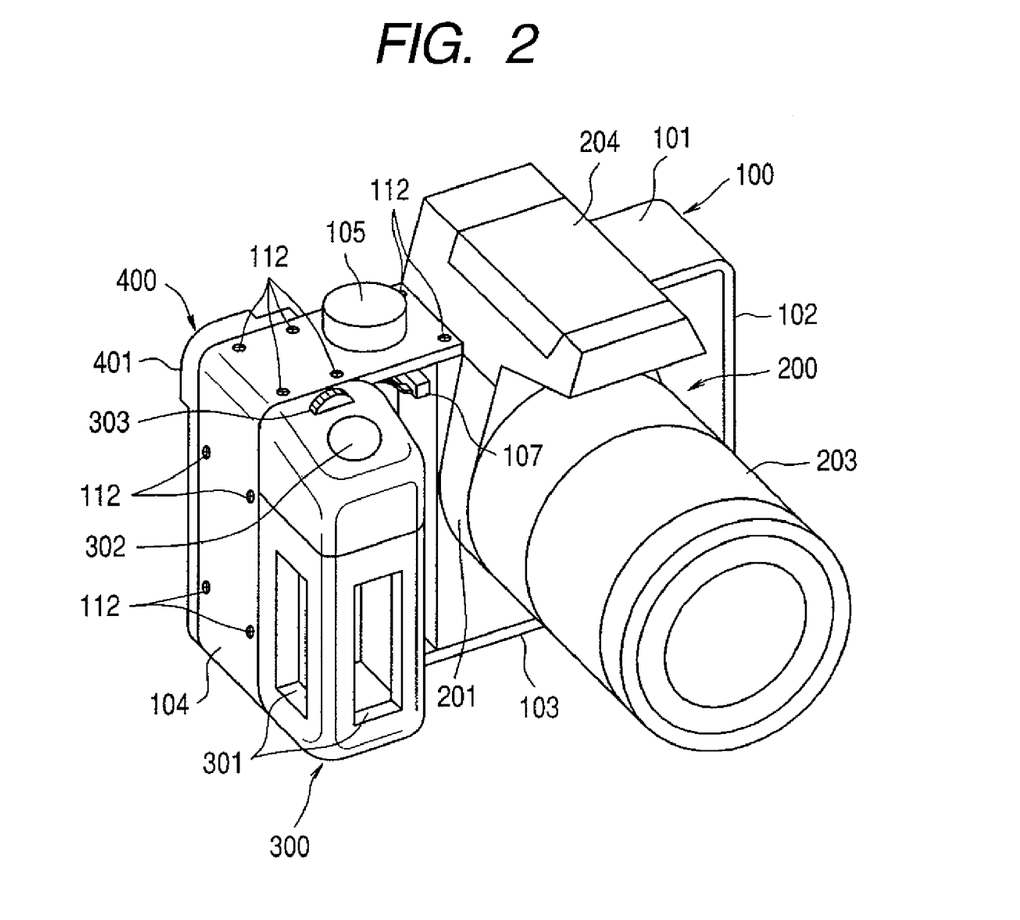
FIG. 2 is a perspective view of the digital single-lens reflex camera as viewed from a front side according to the first embodiment.
Figure 3:
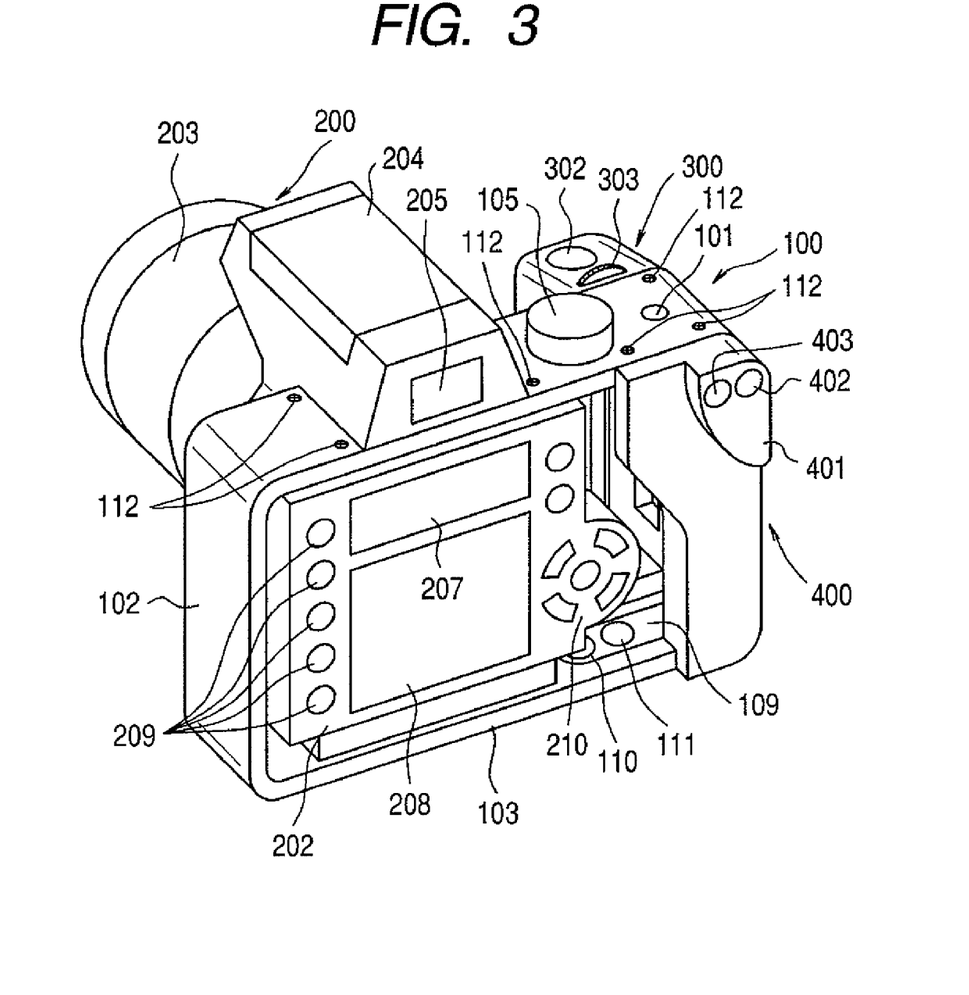
FIG. 3 is a perspective view of the digital single-lens reflex camera as viewed from a back side according to the first embodiment.
Figure 4:
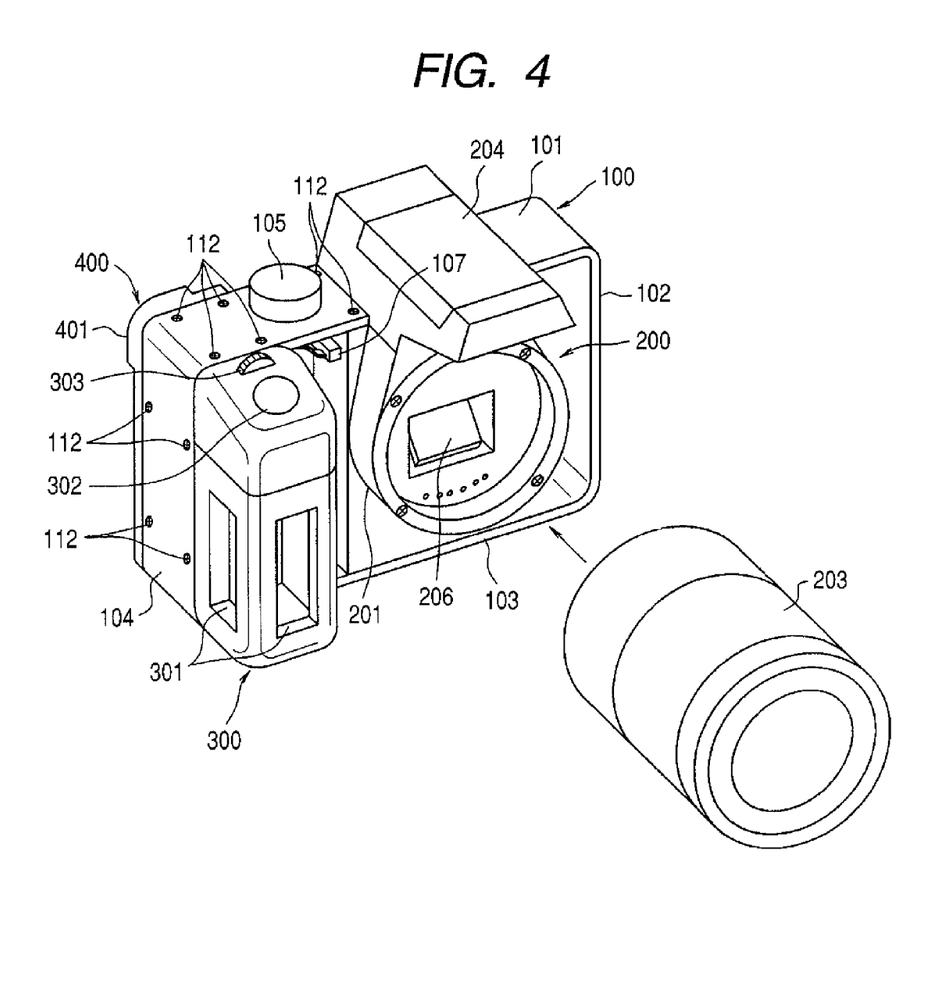
FIG. 4 is a perspective view of the digital single-lens reflex camera as viewed from a front side according to the first embodiment.
Figure 5:
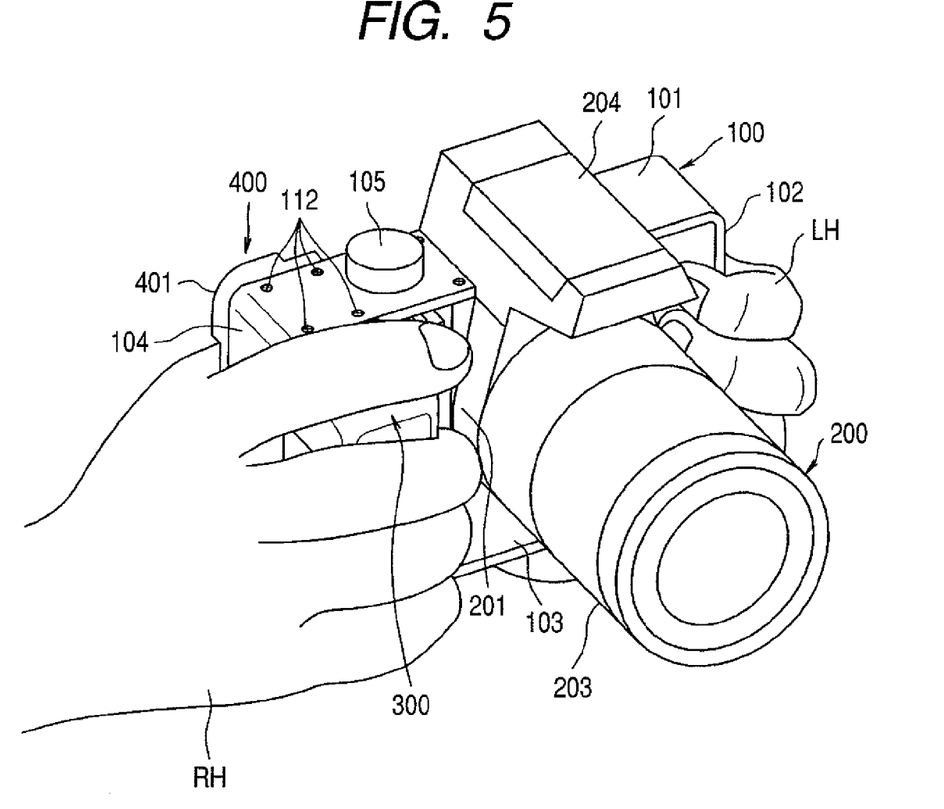
FIG. 5 is a perspective view showing a use state of the digital single-lens reflex camera according to the first embodiment.

FIG. 1 is a perspective view of a digital single-lens reflex camera according to the first embodiment and shows the state that each unit is disassembled from a frame. FIGS. 2, 3 and 4 are perspective views of the digital single-lens reflex camera of the first embodiment and show the state that each unit is mounted on the frame. FIG. 5 is a perspective view showing a use state of the digital single-lens reflex camera of the first embodiment. In this specification, the words "up", "down", "right" and "left" indicate directions in the state that an image pickup device is placed standing on its longer bottom side and the side with a lens (shown in FIGS. 2 and 4) is regarded as the front side.

The digital single-lens reflex camera of the embodiment is constituted of: a frame 100 made of resin or metal and forming an outline including almost the whole upper, lower, right and left outer sides of the camera; a image pickup unit 200 removably mounted on the frame 100; and a front grip unit 300 and a rear grip unit 400 removably mounted on the frame 100.

The frame 100 is constituted continuously of an upper frame part 101, a right frame part 102, a lower frame part 103 and a left frame part 104. A dial switch 105 for switching between photographing modes is mounted on the outer surface of the upper frame part 101. A notch 106 is formed in the front part of the upper frame part 101, a built-in electronic flash 204 of the image pickup unit 200 being allowed to be positioned above the upper frame part 101.

Disposed inside the frame 100 are a connector 107 for connection to the image pickup unit 200, a connector (not shown) for connection to the front grip unit 300, and a connector 108 for connection to the rear grip unit 400. A shielded flexible board 109 is disposed along the inner surface of the frame 100 to electrically interconnect the connectors 107 and 108, dial switch 105, and operation buttons 110 and 111 disposed along the inner surface of the frame 100. The operation buttons 110 and 111 are preferably used not for photographing but for image reproduction.

Threaded holes 112 are formed in the frame 100 at proper positions in order to fix the image pickup unit 200, front grip unit 300 and rear grip unit 400.

The image pickup unit 200 is used for photographing an object and recording and reproducing of image data. The image pickup unit is constituted of: a main body unit 201; a display operation portion 202 integrally formed with the back plane of the main body unit 201; a lens portion (lens barrel) 203 exchangeably mounted on the main body unit 201; the built-in electronic flash 204 integrally formed with the upper portion of the main body unit 201, the built-in electronic flash being popped up during use to emit light, and other components.

The main body unit 201 has therein a reflex mirror 206 (refer to FIG. 4) for confirming an image through a finder 205, an image pickup element (CCD or CMOS) for photoelectrically converting an object image focused by the lens portion 203, a processor for performing various image processings, and other components.

The display operation portion 202 has a display panel 207 for displaying various image-pickup settings and the like, a color liquid crystal monitor 208, various operation buttons 209 (menu button, information button, jump bottom, reproduction button, erase bottom and the like), a four-way operational key 210 for image-pickup selections and the like, and other components. If photographed image data is sequentially displayed on the color liquid crystal monitor 208, an electronic finder function can be realized.

When the image pickup unit 200 is mounted on the frame 100, the image pickup unit 200 is fitted in the frame 100 at the position shifted slightly right from the center, while the built-in electronic flash 204 is positioned on the frame 100 in the notch 106. Since the upper portion of the image pickup unit 200 is superposed upon the inner surface of the upper frame part 101 and the lower portion thereof is superposed upon the inner surface of the lower frame part 103, screws are threaded into the threaded holes 112 to fix the image pickup unit 200 to the frame 100.

The front grip unit 300 is held by a user with the middle finger, medical finger and small finger of the right hand of a user. The front grip unit illustratively shown has a hollow structure in order to make it lightweight, and has openings 301 in order to make it easy for fingers to hold the grip. A shutter button 302 is disposed at the position where an index finger is placed, and an electronic dial 303 is disposed in front of the shutter button for image-pickup settings and selections.

The front grip unit 300 is formed with a fitting portion 304 capable of being fitted in the inside of the frame 100. The fitting portion 304 is formed with a connector 305 to be connected to a connector (not shown) on the side of the frame 100.

When the front grip unit 300 is mounted on the frame 100, the fitting portion 304 of the front grip unit 300 is fitted in the frame 100 from the front side. The front grip unit 300 is fitted in the frame 100 in such a manner that the outer surface of the front grip unit becomes approximately flush with the left outer surfaces of the upper and lower frame parts 101 and 103 and the outer surface of the left frame part 104. In this state, screws are threaded into the threaded holes 112 to fix the front grip unit 300 to the frame 100.

The rear grip unit 400 is held by a user with the palm of a right hand, and is formed with a projection portion 401 on which a thumb is abutted. An operation button 402 (AF frame selection/enlargement button) and an operation button 403 (AE lock/FE lock button/index/reduction button) are disposed on the projection portion 401.

The rear grip unit 400 is formed with a fitting portion 404 capable of being fitted in the inside of the frame 100. The fitting portion 404 is formed with a connector (not shown) to be connected to the connector 108 on the side of the frame 100.

When the rear grip unit 400 is mounted on the frame 100, the fitting portion 404 of the rear grip unit 400 is fitted in the frame 100 from the back side. The rear grip unit 400 is fitted in the frame 100 in such a manner that the outer surface of the rear grip unit becomes approximately flush with the left outer surfaces of the upper and lower frame parts 101 and 103 and the outer surface of the left frame part 104. In this state, screws are threaded into the threaded holes 112 to fix the rear grip unit 400 to the frame 100.

According to the digital camera of the embodiment described above, since spaces are provided in the frame 100 at the right and left of the image pickup unit 200, as shown in FIG. 5, the grip units 300 and 400 can be held by a right hand RH and fingers thereof can be inserted into the frame 100, and the right frame part 102 of the frame 100 can be held with a left hand LH and fingers thereof can be inserted into the frame 100. Since fingers can be inserted into the frame 100, the digital camera can be held firmly with the grip units 300 and 400 having generally the same size as a grip formed by forming concave and convex portions on the monocock body structure.

Figure 6:
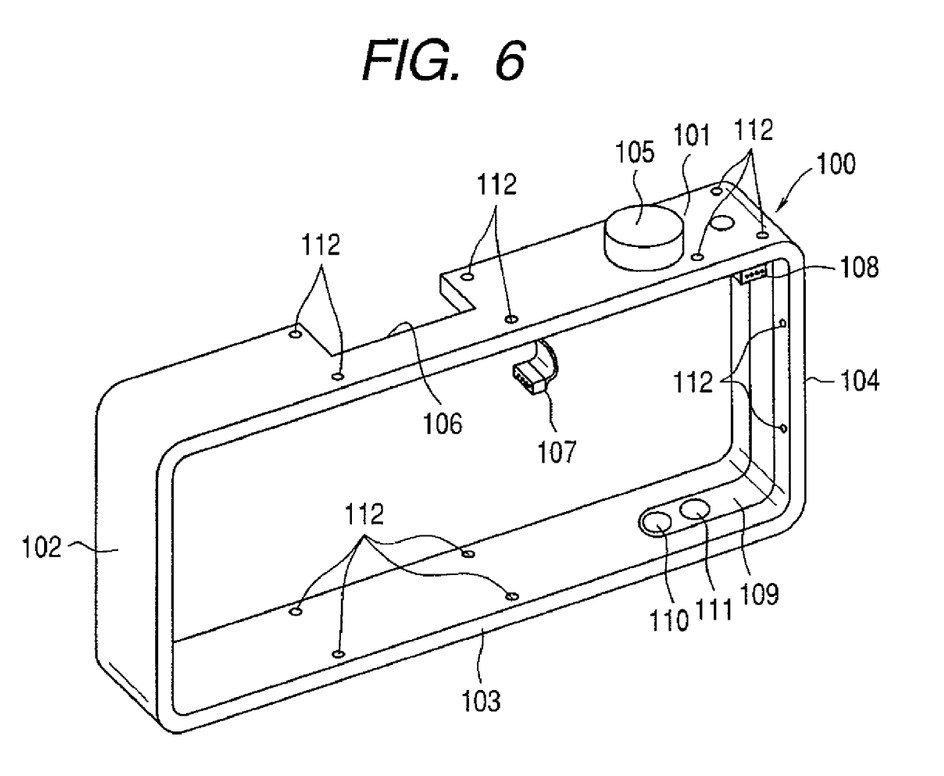
FIG. 6 is a perspective view showing an example of another frame.
Figure 7:
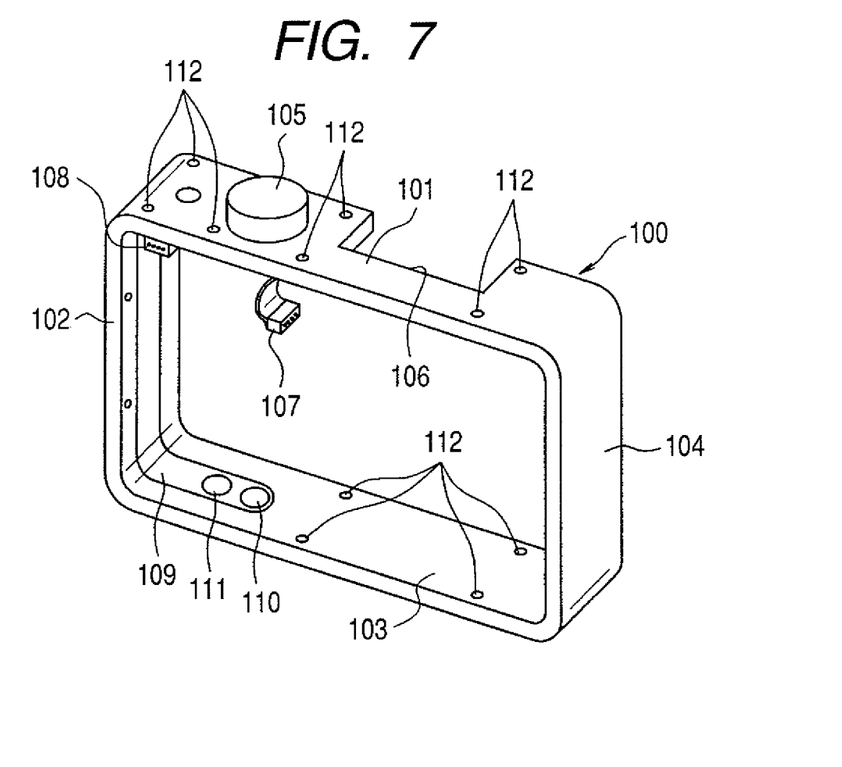
FIG. 7 is a perspective view showing an example of another frame.

Further, by preparing front grip units 300 and frames 100 of various sizes, it becomes possible to provide digital cameras of custom made satisfying all user requirements. For example, frames 100 of large size (as shown in FIG. 6, the width in right and left directions is made wide although the height is the same as that shown in FIGS. 1 to 5) and front grips 300 of large size are prepared for users having large hands and users handling cameras with gloves. As shown in FIG. 7, frame 100 for left-handed users may also be prepared.

Since each of the units 200, 300 and 400 can be disassembled from the frame 100, a user can mount a desired unit or exchange each unit in accordance with the usage and the like.

In the above embodiment, although three units, the image pickup unit 200, front grip unit 300 and rear grip unit 400, have been described, the units are not limited to three units, but any combination of units is possible. For example, the display operation portion 202 of the image pickup unit 200 of the embodiment may be another unit to be mounted on the frame. In this case, for example, by using the same display operation unit, the image pickup unit may be replaced with a new image pickup unit having an image pickup element having a larger number of pixels and raising the grade of a image-pickup function.

Second Embodiment

Figure 8:
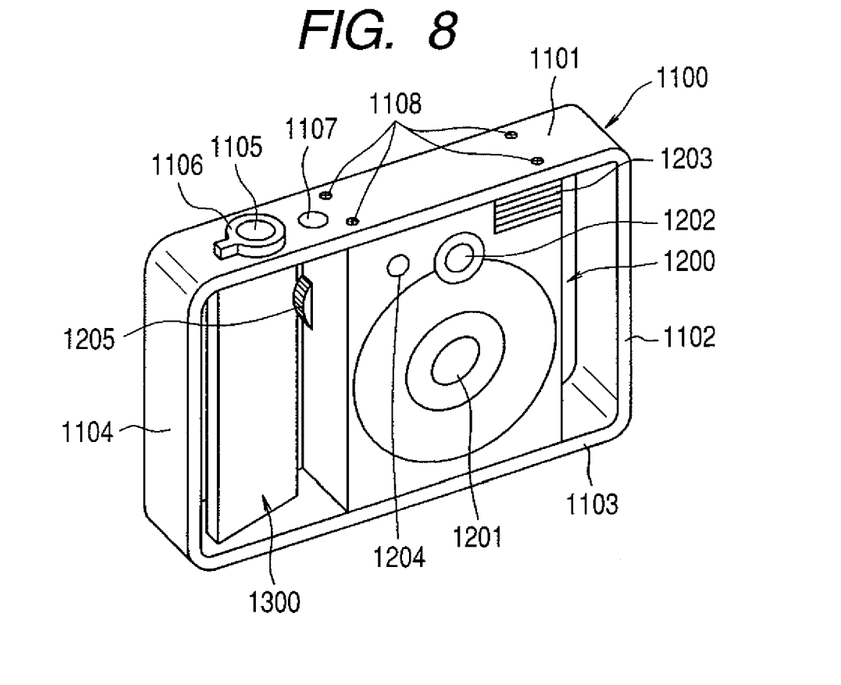
FIG. 8 is a perspective view of a compact digital camera as viewed from a front side according to a second embodiment.
Figure 9:
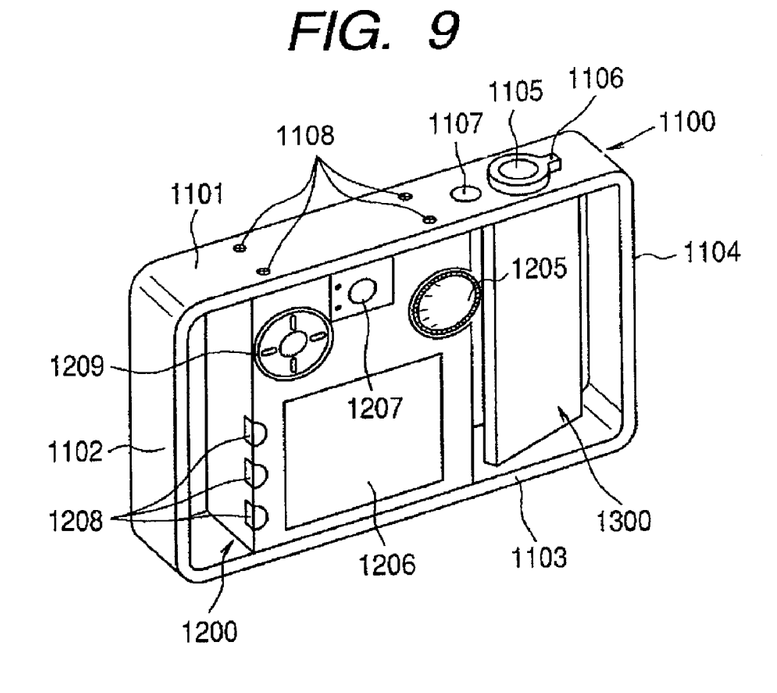
FIG. 9 is a perspective view of the compact digital camera as viewed from a back side according to the second embodiment.

The second embodiment shown in FIGS. 8 and 9 is an example of a compact digital camera to which the present invention is applied. The fundamental structure is similar to that of the digital single-lens reflex camera. In the following, description will be made mainly on different points from the digital single-lens reflex camera of the first embodiment.

A compact digital camera of the second embodiment is constituted of: a frame 1100 made of resin or metal and forming an outline including almost the whole upper, lower, right and left outer sides of the camera; a image pickup unit 1200 removably mounted on the frame 1100; and a grip unit 1300 removably mounted on the frame 1100.

The frame 1100 is constituted continuously of an upper frame part 1101, a right frame part 1102, a lower frame part 1103 and a left frame part 1104. In the frame 1100, reference numeral 1105 denotes a shutter button, reference numeral 1106 denotes a zoom lever, reference numeral 1107 denotes a power switch, reference numeral 1108 denotes a threaded hole for threading a screw to fix the image pickup unit 1200.

The image pickup unit 1200 has a flat shape without protruding from front and back sides, and is accommodated in the frame 1100. In the image pickup unit 1200, reference numeral 1201 denotes a lens, reference numeral 1202 denotes a finder window, reference numeral 1203 denotes an electronic flash, reference numeral 1204 denotes a lamp, and reference numeral 1205 denotes a dial switch for switching between image-pickup modes (refer to FIG. 8). Reference numeral 1206 denotes a color liquid crystal monitor, reference numeral 1207 denotes a finder, reference numeral 1208 denotes various operation buttons (menu button and the like), and reference numeral 1209 denotes a four-way operational key to be used for image-pickup selections and the like (refer to FIG. 9).

The grip unit 1300 is made of a plate member and positioned diagonally in the frame 1100 to be positioned inner at the side of the image pickup unit 1200.

Figure 10:
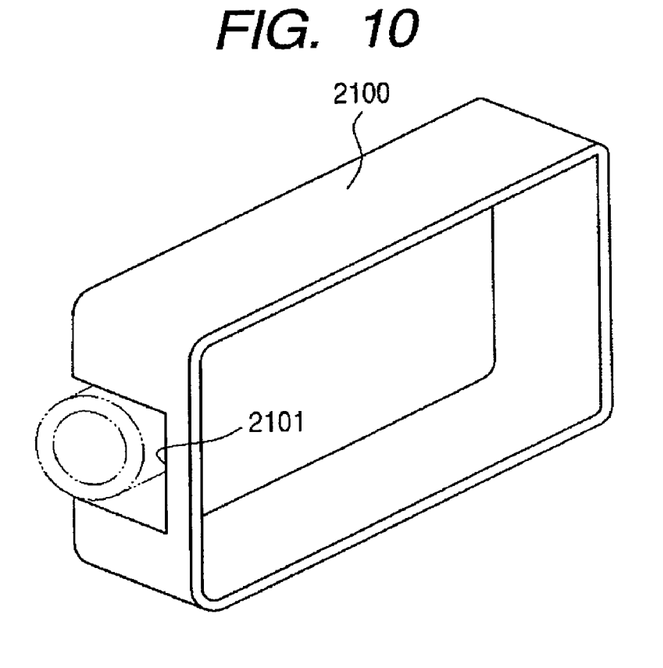
FIG. 10 is a perspective view showing an example of a frame of the digital video camera.

The present invention has been described in connection with the embodiments. The present invention is not limited to the embodiments, but various modifications are possible without departing from the scope of the present invention. Although the digital camera has been described illustratively in the embodiments, the type of an image pickup device is not limited. For example, the invention may be applied to a digital video camera and the like. Many digital video cameras are long in the direction from its front to its back. In this case, as shown in FIG. 10, a frame 2100 may be used which has a size defined by upper, lower, right and left outer sides of the camera. Reference numeral 2101 denotes a notch for protruding a lens portion (lens barrel) from the frame 2100.

In the embodiments, although the frame 100 (1100) is constituted continuously of the upper frame part 101 (1101), right frame part 102 (1102), lower frame part 103 (1103) and left frame part 104 (1104), a frame formed by assembling divided parts or a frame not partially continuous may also be used.

As described so far, according to the first and second embodiments, the monocock body structure is not adopted but a frame structure is adopted which is defined by upper, lower, right and left outer sides or upper, lower and front and back outer sides of an image pickup apparatus. It is therefore possible to insert fingers into the frame when a user holds the image pickup apparatus, and to hold the image pickup apparatus firmly.

Further, by using various types of frames and units, it becomes possible to provide image pickup apparatus of custom made satisfying all user requirements. For example, frames and grip units of large size are prepared for users having large hands and users handling cameras with gloves.

As each unit can removably mounted on the frame, it is possible for a user to mount a desired unit or replace each unit with a new one in accordance usage and the like.

The present invention is not limited to the above embodiments and various changes and modifications can be made within the spirit and scope of the present invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image pickup apparatus comprising:
   a frame forming an outline of the image pickup apparatus;
   an image pickup unit detachably mounted on the frame, the image pickup unit being configured to pick up an object image to generate image data; and
   a grip unit detachably mounted on the frame, the grip unit having a operation member and functioning as a grip of the image pickup unit when being mounted on the frame;
   wherein a first connector which is configured to be electrically connected to the image pickup unit, and a second connector which is configured to be electrically connected to the grip unit are disposed inside the frame, and
   wherein an inside operation member which is disposed on an inner surface of the frame, and a shielded flexible board is disposed along the inner surface of the frame to electrically connect the inside operation member and the second connector to each other.

2. The image pickup apparatus according to claim 1, wherein the inside operation member is disposed at such a position that even when the image pickup unit and the grip unit are mounted on the frame, the inside operation member remains being operatable by an operator.

3. The image pickup apparatus according to claim 1, wherein the inside operation member is used for image reproduction.

4. The image pickup apparatus according to claim 1, wherein the grip unit is constructed with a front grip unit and a rear grip unit such that the frame is held between the front grip unit and the rear grip unit when the front grip unit and the rear grip unit are mounted on the frame.

* * * * *